Figure 1:
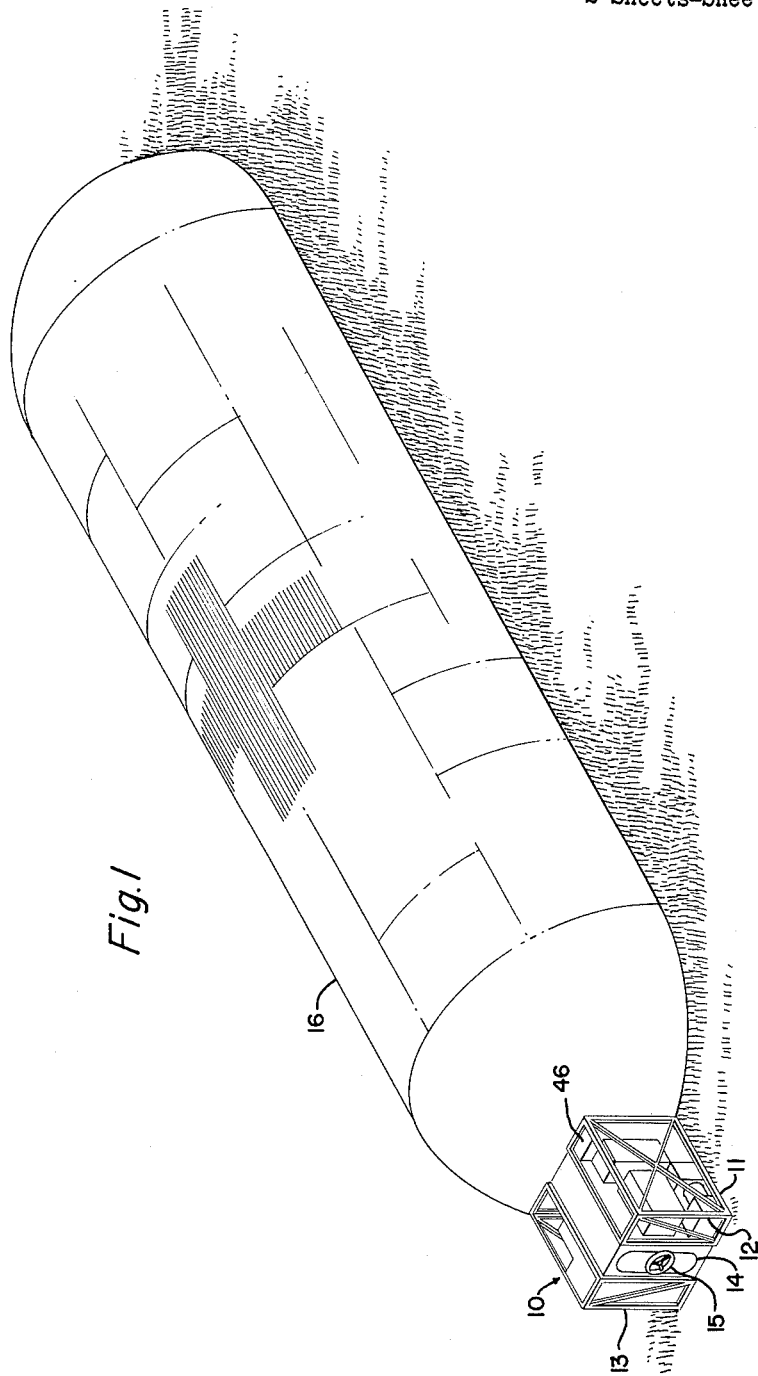

3,261,659
PACKAGED ENVIRONMENTAL SYSTEM FOR DECONTAMINATING AIR
Albert Henry Schwichtenberg, Albuquerque, N. Mex., and Archibald P. Kelley, Boris D. De Baryshe, and Selden B. Spangler, Jr., Scottsdale, Ariz., assignors to The Garrett Corporation, Los Angeles, Calif., a corporation of California
Filed Feb. 23, 1962, Ser. No. 175,220
12 Claims. (Cl. 21—53)

This invention relates to a protective environmental system and apparatus for supplying breathable air which has been freed of any atomic, biological and chemical warfare agents, and particularly to such a system and apparatus which may function in combination with a source of shaft power and suitable means for heating, cooling or otherwise conditioning the decontaminated air. The invention aims to provide such an environmental system which utilizes certain characteristics inherent in gas turbine machinery for the decontamination and conditioning operations, and especially such a system which may be used for inflating a temporary shelter with sterilized air.

Currently known warfare methods may cause the air to become contaminated with both biological and poisonous chemical agents, as well as with various forms of radioactive particles created by atomic explosions or other means. In war and disaster areas where such air contamination may be present and where both temporary and permanent protection shelters may be provided, there is a need to supply properly decontaminated and temperature conditioned air to the shelter areas. This is accomplished, according to the present invention, by the provision of a unitary environmental decontamination system which includes a gas turbine and suitable separators, sterilizers, heat exchangers, and filters, whereby all harmful agents are removed and pure conditioned air may be supplied to a protective enclosure used in conjunction with, and forming part of, the system.

Accordingly, the present invention has for its principal object the provision of a unitary environmental system for use in conjunction with protective shelters, which system will decontaminate breathing air of chemical, biological and radiological warfare agents.

Another object of the invention is to provide such an environmental system which is based on the use of gas turbine machinery that is also adapted to supply shaft power to a protective enclosure, as well as performing other air conditioning treatments to the air.

Still another object is to provide a protective environmental system for decontaminating breathing air of chemical, biological and radiological warfare agents, which system comprises the combination of a gas turbine, a filter, a catalyst bed, and a heat exchanger.

A further object of the invention is to provide a protective environmental system of the type herein referred to wherein high temperature oxidation and pyrolysis are used for large scale decontamination of chemical warfare agents present in the incoming air.

Another object of the invention is to provide a protective environmental system of the type herein referred to wherein high temperature combined with filters and/or separators will provide effective sterilization and removal of any bacteriological agents present in the incoming air.

Another object of this invention is to utilize the waste heat inherent in the exhaust of a gas turbine or other heat engine for the sterilization of biological materials and/or the cracking, pyrolysis and oxidation of chemical agents contained in a fluid stream.

It is another object of the invention to provide a protective environmental system in which a gas turbine is used to produce an internal sound field for agglomerating and freeing an aerosol of harmful particles in order to provide effective air purification.

Another object is to provide a combination environmental system and inflatable shelter wherein the shelter may be initially inflated and then maintained in inflated condition and continuously supplied with decontaminated breathable air.

One further object of the invention is to provide a unitary protective environmental system which may be mounted on a vehicle for movement and ultimate connection to a permanent or temporary portable shelter, and comprises a gas turbine to provide a lightweight source of shaft power, compressed air and heat; a separator or filter for removing particles of more than 1–2 microns in diameter; an exhaust-gas-to-bleed-air heat exchanger or sterilizer which will heat the bleed air to approximately 1000° F. with a holdup time of about 100 milliseconds, thereby effectively sterilizing the most resistant biological material; a catalyst bed which may be combined with the sterilizer to promote oxidation and pyrolysis of chemical warfare agents; a heat exchanger with suitable air conditioning controls to cool the hot bleed gas; and an exit filter to remove any remaining undesirable breakdown products and volatile radioactives from the purified air.

Figure 2:
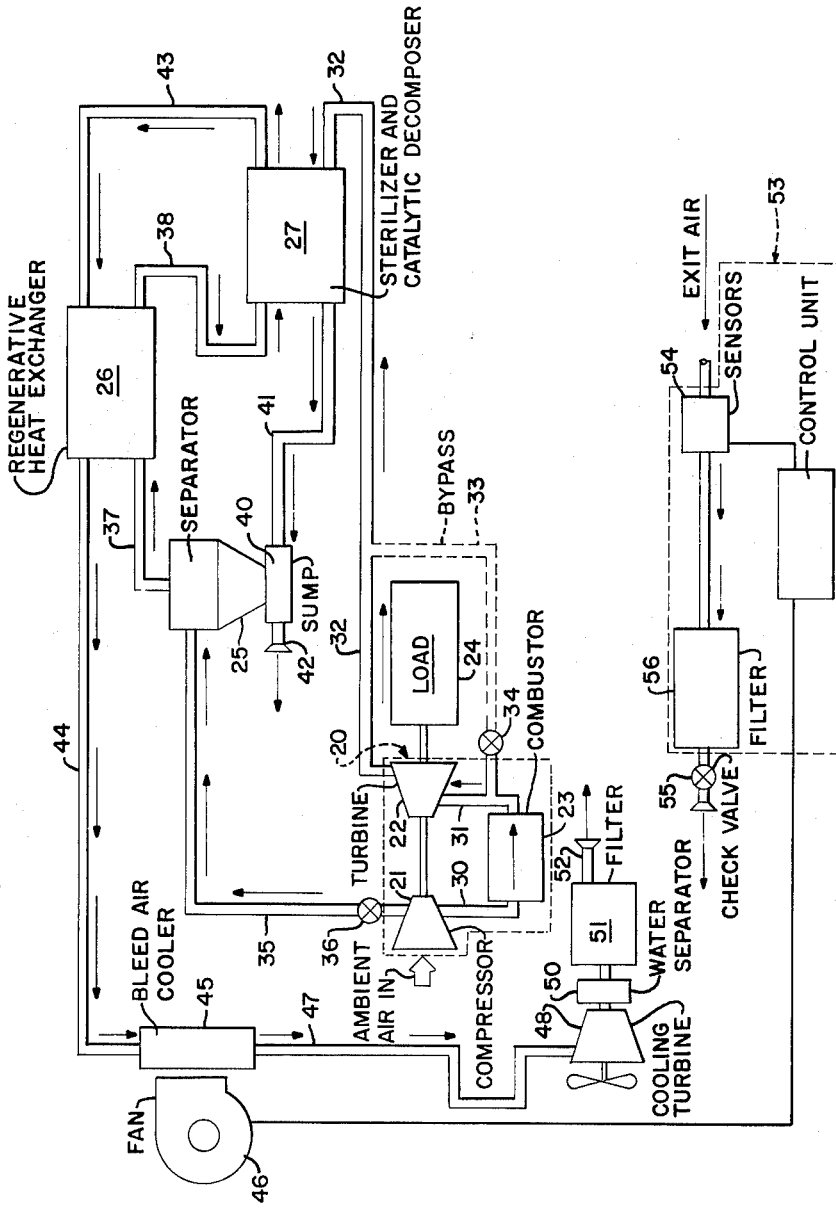

The above and other features and objects of the invention will be apparent from the following more detailed description and the accompanying drawings, in which:

FIG. 1 is a perspective view of a unitary protective environmental system embodying the principles of this invention shown applied to, and combined with, a temporary inflatable hospital structure; and FIG. 2 is a schematic flow diagram showing the interrelationship of the various elements of the environmental system and their order of functioning in removing the decontaminants from the air supply.

As shown in FIG. 1, a packaged environmental system or unit 10, constructed in accordance with this invention, may be housed in a suitable frame 11, composed of lightweight structural members fastened together in the desired shape to form right- and left-end carriage sections 12 and 13, respectively, and a central entrance chamber 14 which may be in the form of an air lock having an entrance hatch 15. This or a similar method of packaging makes it possible to move the unit from place to place by truck or other suitable vehicle so that it may be arranged to supply purified and/or sterilized air to any protective shelter, such as an inflatable plastic hospital shelter 16. The particular shelter shown in the present instance is illustrative of a form of temporary protective shelter with which the new environmental system 10 may be used. According to one important aspect of this invention, the shelter 16 may be in the form of an elongated, balloonlike, plastic bag made of polyethylene film, rubberized fabric, or the like, largely semicylindrical in shape with one flat side which may form the floor, as shown in FIG. 1; and this structure, which may be folded flat and stored in the entrance chamber 14 during transportation to the desired location, may then be inflated with sterilized and decontaminated air to make it ready for occupancy and operation. It will also be noted in FIG. 1 that the various parts of the environmental system 10 are all housed within the right- and left-end frame sections 12 and 13 of frame 11, and thus provide a unitary structure for performing the decontaminating, sterilizing, conditioning, and power supplying functions, as will now be described.

It is to be understood that the invention is further based on the discovery that certain characteristics of the operation of gas turbine machinery, such as a combination compressor and gas turbine, effect a positive removal of particular types of contaminants that may be present in the air being fed to the turbine compressor, and also provide waste heat which may be used for other purifying operations. One satisfactory arrangement of the operating components making up the unitary environmental system 10 is shown as a schematic flow diagram in FIG. 2. The illustrated arrangement comprises gas turbine machinery 20 having a compressor 21 driven by a turbine 22 which receives pressurized gas from a combustor 23 and may also be arranged to drive a suitable generator 24 for supplying power to the shelter 16 shown in FIG. 1. Fuel is fed to the combustor in a conventional manner from any suitable source (not shown). In addition to the gas turbine machinery 20, the unitary environmental system 10 includes a separator or filter 25 for removing particles more than 1–2 microns in diameter, a regenerative heat exchanger 26, a sterilizer and catalytic decomposer 27 in the form of an exhaust-gas-to-bleed-air heat exchanger, and other miscellaneous equipment and piping and controls that will be referred to in greater detail as the description proceeds.

To practice the present invention, the gas turbine machinery 20 selected will supply either bleed air or shaft power or both with certain minor modifications for this particular application. For example, when the machine is designed to operate at constant speed in order to drive an A.C. generator, the pressure ratio does not vary appreciably and control of bleed and shaft output is accomplished by adjusting the turbine inlet temperature. At light loads, the turbine exhaust temperature is below 1000° F. because the turbine temperature is low. Various possibilities exist for maintaining a high exhaust temperature which, it will be understood, in the present application is desirable. The most obvious is to match the gas turbine capacity to the requirements of the compartment or shelter 16 so that the unit runs at reasonable power levels near its most efficient point. If the unit must run at low powers, a bypass and afterburner arrangement may be used for light loads. A turbine exhaust pressure control may also be used to decrease the turbine head available and cause higher gas temperatures to exist.

Another modification of the gas turbine unit may be required in taking advantage of the separating and agglomerating forces inherent in the centrifugal compressor to effect particle separation upstream of the main separator 25. It has been found that the centrifugal and scrubbing action in the compressor stages will act to agglomerate the submicron particles into particles of the order of 2–10 microns in diameter so that later separation will be made easier. Agglomeration is also effected, in part, by the internal high sound field of the turbine-compressor which may be enhanced by turning the ducts associated therewith.

Separator or filter 25 is an important component of the unitary environmental system. The principal problem in separating out the radioactive dust particles occurs in the small particle range, particularly in mechanical separation systems. A cyclone separator is contemplated, and, if any particular problems are encountered with small particles, several such separators may be used in series with one designed especially for the range of 1 micron. In addition, filters may be used downstream of the separators for small-sized particle removal. It is anticipated, however, that one normal cyclone separator or a plurality of small cyclones, such as "Rotoclones," will be sufficiently effective in the present combination, since the high intensity sound created in the compressor causes particles to agglomerate. In this way the particle size may be increased by such acoustic agglomeration to the point where there will be maximum efficiency in any subsequent mechanical separation.

In order to obtain the greatest efficiency in the total operation, a regenerative heat exchanger may be used first to heat the bleed air prior to its passage to the sterilizer, and then later to cool said bleed air. It is designed so that the flow rate will be identical on either side and may be of the plate-fin, cross-flow type—small, light and efficient in operation.

Sterilizer-catalytic decomposer 27 is the next important element in the combination, since it is the unit where, by means of heat and catalytic decomposition, the poisonous elements of any chemical and/or biological warfare agents are rendered ineffective. It is important that the sterilizer-catalytic decomposer be designed to heat the bleed air to approximately 1000° F. and hold it in the unit for about 100 milliseconds until proper sterilization and decomposition have taken place. The catalytic decomposer portion of the unit 27 may be of any suitable type employing metal catalysts, such as platinum, vanadium and/or nickel on the usual bed of aluminum oxide or asbestos.

When it is desired to mount the various components of the environmental system in a frame so as to provide the unitary structure shown in FIG. 1, it will be apparent that the interconnecting ducts and piping between the various units will be extremely short, or even non-existent, and that the arrangement shown in FIG. 2 greatly exaggerates the distance between the components. This is particularly true of the gas turbine machinery 20 where, in reality, there are no ducts between the various parts. Thus, a conduit 30 leads compressed air from the compressor 21 to the combustor 23, and a conduit 31 directs the products of combustion into the turbine 22 (conduits 30 and 31 are actually part of the gas turbine 20). The exhaust of the turbine leads directly through a pipe 32 to the sterilizer-catalytic decomposer 27 so as to provide the highest temperature possible in that unit. In the event that higher temperatures should be required, a bypass conduit 33, under the control of a valve 34, may be arranged to lead at least some of the heated gases directly from the combustor into the conduit 32 and thence directly to the decomposer 27.

Bleed air from the compressor 21 is led directly through a conduit 35 under the control of a valve 36 to the filter separator 25; and said conduit 35 may be designed to resonate with the internal sound field of the turbine to force agglomeration of the suspended particles in any aerosol present in the air stream. Separator 25 removes the various particles and agglomerates from the bleed air that have not been removed by the turbine-compressor 21, so that air substantially free of particles is passed through a conduit 37 and to the regenerative heat exchanger 26. A conduit 38 then leads the heated bleed air into the sterilizer decomposer unit 27 for its final clarification and purification step.

An important feature of the present environmental system consists in the provision of a sump pan 40 beneath the separator 25 and its interconnection through conduit 41 with the turbine exhaust gases leaving the sterilizer. In this way the particles removed from the air stream by the separator 25 and settling in the sump pan 40 are given a sterilization treatment of any desired duration before being discharged to the ambient atmosphere through a discharge port 42.

After the bleed air passes through the sterilizer-catalytic decomposer, the air stream passes through a conduit 43 to the regenerative heat exchanger where it loses heat to the incoming air from the turbo-compressor, which air entered component 26 through conduit 38.

At this point, the air which has been led into the compressor 21 is now relatively free of major noxious components so that it may pass through a conduit 44 to a bleed air cooler 45 which is cooled by a fan 46. It is desirable that the effectiveness of the bleed air cooler 45 be high so that the bleed air exit temperature may be low; and said cooler should be sized so that the system will be able to provide suitable shelter air temperatures over the range of environmental or ambient temperatures to be expected in a particular area.

Should the environmental temperature be on the high side so that further cooling might be required, this may be accomplished with an air cycle cooling system having an expansion or cooling turbine. Thus, the air from the bleed air cooler 45 may be led through a conduit 47 to expansion turbine 48 where the temperature of the air may be lowered further by extracting energy from the air in the form of mechanical work. Any condensation occurring may be collected in a water separator 50 and the air finally passes through a suitable exit filter 51 (probably of the low-velocity charcoal type) and into the enclosure 16 through a suitable exhaust duct 52. The air at the exit of the water separator will be sterile and contain no organic poisons or solid radioactive materials. It is the function of the filter to remove both acid gases, such as $NO_2$, $SO_2$ and $HCl$, which may be present as the result of the decomposition of the chemical warfare agents and volatile fallout components, such as radioactive iodine. A high temperature chemical absorbent filter of the "molecular sieve" type could be used in place of the chemical type, if desired.

To hold the environmental temperature at any preset value, a simple closed loop servo system 53 may be provided. Such a system may include a thermostat or other temperature sensor 54 which is arranged to measure the temperature of the exit air as it flows out through a check valve 55 and filter 56. The thermostat signal may then be used to regulate the flow of external ambient air over the air cooler prior to the entrance of the air into the compressor.

Although there has been described an effective unitary apparatus for providing a decontaminated environment, it will be understood that certain basic changes may be made in the primary combination of elements and still obtain the same satisfactory results. For example, as already mentioned, the regenerative heat exchanger is used primarily to obtain maximum efficiency, and it will be apparent that this component may be eliminated so that the bleed air will pass directly from the separator 25 to the sterilizer-catalytic decomposer 27, which itself is a heat exchanger; or the catalyst bed may be separated from the sterilizer. In addition, air cycle air conditioning may require an extra small compressor stage which would be specially designed to give best air cleaning, and either Freon or absorption cycle refrigeration equipment might be used in place of air cycle refrigeration. Various other changes may be made in the construction and certain features may be employed without others without departing from the invention or sacrificing any of its advantages.

We claim:

1. Apparatus for supplying decontaminated breathable air to an enclosure, comprising:
   a. compressor means which is adapted to receive a supply of air containing any of a group of contaminants including chemical, biological and radiological agents;
   b. combustion turbine means for driving said compressor means;
   c. separator means for removing specific particles of contaminants from the air leaving said compressor means;
   d. sterilizing and decomposing means for destroying both chemical and biological agents;
   e. means for conveying bleed air from said compressor to said separator means and then to said sterilizer; and
   f. means for supplying hot combustion gases from said turbine means to said sterilizing and decomposing means to heat said sterilizing and decomposing means to heat said sterilizing and decomposing means to an elevated temperature.

2. Apparatus for supplying decontaminated breathable air to an enclosure, comprising:
   a. compressor means which is adapted to receive a supply of air containing any of a group of contaminants including chemical, biological and radiological agents;
   b. combustion turbine means for driving said compressor means;
   c. separator means for removing specific particles of contaminants from the air leaving said compressor means;
   d. sterilizer means for destroying both chemical and biological agents;
   e. means for conveying bleed air from said compressor to said separator means;
   f. heat exchange means;
   g. means for conveying air from said separator to said heat exchange means for preheating said air;
   h. means for conveying hot combustion gases from said turbine means to said sterilizer;
   i. means for conveying preheated air from said heat exchange means to said sterilizer;
   j. means for conveying air from said sterilizer back to said heat exchange means; and
   k. means for cooling air received from said heat exchange means and adapted to exhaust it into said enclosure.

3. In an environmental system for supplying decontaminated breathable air to an enclosure, the combination of:
   a. compressor means which is adapted to receive a supply of air containing any of a group of contaminants including chemical, biological and radiological warfare agents;
   b. combustion turbine means for driving said compressor means;
   c. separator means for removing specific particles of contaminants from the air leaving said compressor means, said separator means including a sump chamber;
   d. sterilizer means for destroying both chemical and biological warfare agents;
   e. means for conveying bleed air from said compressor means to said separator means and then to said sterilizer:
   f. means for supplying hot combustion gases from said turbine means to said sterilizer to heat said sterilizer to an elevated temperature;
   g. means conveying hot gases from said sterilizer to said sump chamber; and
   h. means for conveying decontaminated air from said separator means to said enclosure.

4. A unitary environmental system, comprising:
   a. an inflatable bag which will constitute an enclosure when inflated;
   b. compressor means adapted to receive a supply of air containing any of a group of contaminants including chemical, biological and radiological warfare agents;
   c. combustion turbine means for driving said compressor means;
   d. means associated with said compressor and combustion turbine means for removing and destroying the contaminating agents in the air supply; and
   e. means for conveying the decontaminated air supply to said inflatable bag for inflating said bag with decontaminated breathable air and thereby rendering it immediately ready for occupancy.

5. A unitary environmental system for protection against chemical, biological and radiological warfare agents, comprising:
   a. a supporting frame forming a plurality of chamber sections;
   b. a large inflatable bag constituting a protective enclosure at one end of said frame when inflated, one of the chamber sections formed by said frame constituting an entrance chamber to the enclosure formed by said bag when inflated and a storage receptacle for said bag when the bag is deflated; and c. means disposed in another of the chamber sections formed by said frame providing a continuing source of decontaminated breathable air for inflating said bag and maintaining it in an inflated condition.

6. The method of removing chemical and biological agents from an air stream comprising:
a. passing the air stream containing said agents through indirect heat exchange relationship with gases at approximately 1000° F. constituting the exhaust of a gas turbine.

7. A method of decontaminating air for breathing, comprising the steps of:
a. compressing the air;
b. mixing a first part of the compressed air with fuel and burning the mixture to provide gases of combustion;
c. expanding the gases of combustion in a mechanism to provide power to effect the air compressing step;
d. passing the second part of the compressed air through an instrumentality to remove solid foreign materials therefrom;
e. then passing said second part of the compressed air through heat exchange relationship with the gases of combustion following the expansion of the latter; and
f. cooling the second part of the compressed air to temperature suitable for breathing purposes.

8. A unitary enviromental system, comprising:
a. a supporting frame;
b. means on said frame providing a chamber constituting an air lock with door means at each end;
c. an inflatable bag secured to said frame and providing an enclosure when inflated, said air lock forming an entrance to said enclosure and a receptacle for said bag when the same is deflated;
d. means mounted on said frame providing a continuous source of decontaminated breathable air for inflating and maintaining the inflation of said bag, said means having a gas turbine engine for compressing air, a centrifugal separator for removing foreign particles from part of the compressed air, means heated by the exhaust from said gas turbine engine for raising the temperature of said part of the compressed air to sterilize the same, and means for cooling the clean sterilized air prior to introducing it into said inflatable bag.

9. A unitary environmental system, comprising:
a. a supporting frame;
b. means on said frame providing a chamber constituting an air lock with door means at each end;
c. an inflatable bag secured to said frame and providing an enclosure when inflated, said air lock forming an entrance to said enclosure and a receptacle for said bag when the same is deflated;
d. means mounted on said frame providing a continuous source of decontaminated breathable air for inflating and maintaining the inflation of said bag, said means having a gas turbine engine for compressing air, a centrifugal separator for removing foreign particles from part of the compressed air, means heated by the exhaust from said gas turbine engine for raising the temperature of said part of the compressed air to sterilize the same, means for passing the air flowing from said centrifugal separator into heat exchange relationship with the heated sterilized air to preheat the air prior to sterilization, and means for cooling the cleaned sterilized air prior to introducing it into said inflatable bag.

10. A method of decontaminating air for breathing, comprising the steps of:
a. passing the air through a gas turbine driven compressor;
b. subjecting the compressed air to the action of a centrifugal separator to remove foreign particles therefrom;
c. passing the air discharged from the centrifugal separator through heat exchange relationship with the exhaust from the compressor driving turbine to sterilize the air; and
d. cooling the air after the sterilization step for breathing purposes.

11. A method of decontaminating air for breathing, comprising the steps of:
a. passing the air through a gas turbine driven compressor;
b. subjecting the compressed air to the action of a centrifugal separator to remove foreign particles therefrom;
c. preheating the air discharged from the centrifugal separator;
d. passing the preheated air through heat exchange relationship with the exhaust from the compressor driving turbine to sterilize the air;
e. cooling the sterilized air through heat exchange thereof with ambient air; and
f. refrigerating the cooled sterilized air for breathing purposes.

12. A method of decontaminating air for breathing, comprising the steps of:
a. passing the air through a gas turbine driven compressor;
b. subjecting the compressed air to the action of a centrifugal separator to remove foreign particles therefrom;
c. passing the air discharged from the centrifugal separator through heat exchange relationship with the exhaust from the compressor driving turbine to sterilize the air;
d. passing the sterilized air through heat exchange relationship with ambient air to precool the sterilized air;
e. refrigerating the precooled sterilized air by passing the same through an expansion-type cooling turbine; and
f. discharging the refrigerated sterilized air into an enclosure for breathing purposes.

References Cited by the Examiner

UNITED STATES PATENTS

| | | | |
|---|---|---|---|
| 1,706,594 | 3/1929 | Schiller et al. | 21—53 |
| 2,215,484 | 9/1940 | St. Clair | 55—277 X |
| 2,678,532 | 5/1954 | Miller | 60—39.05 |
| 3,042,051 | 7/1962 | Mauldin | 135—1 |
| 3,051,164 | 8/1962 | Trexler | 128—1 |
| 3,109,721 | 11/1963 | Zenner et al. | 55—277 X |

DONALL H. SYLVESTER, *Primary Examiner.*

MORRIS O. WOLK, *Examiner.*

S. ROSEN, A. D. KELLOGG, *Assistant Examiners.*